W. H. STERLING.
Railroad Ties.
No. 139,031. Patented May 20, 1873.
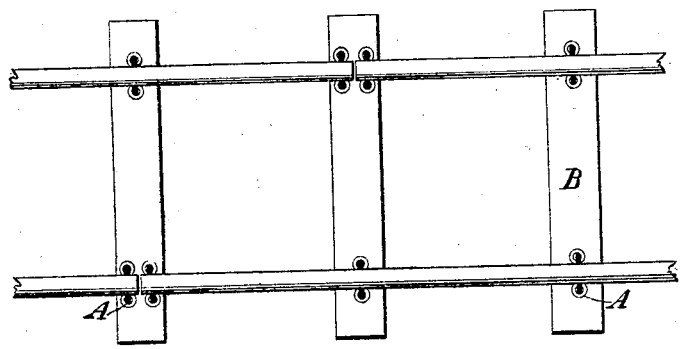
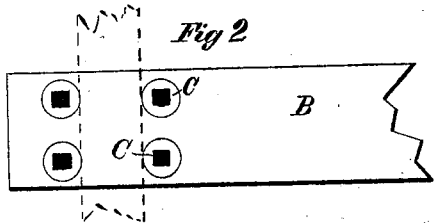
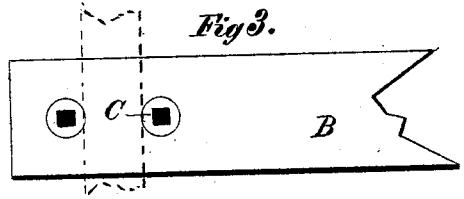
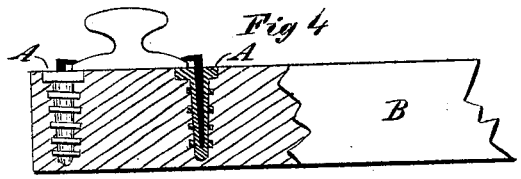
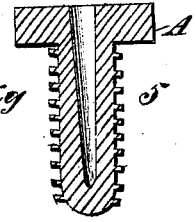
Witnesses:
Harrie C. Clark
R. N. Dyer
Inventor
William H. Sterling
by Dyer, Beadle & Co
Attys.

UNITED STATES PATENT OFFICE.

WILLIAM H. STERLING, OF SAN FRANCISCO, CALIFORNIA.

IMPROVEMENT IN RAILROAD TIES.

Specification forming part of Letters Patent No. 139,031, dated May 20, 1873; application filed September 9, 1872.

*To all whom it may concern:*

Be it known that I, WILLIAM H. STERLING, of the city and county of San Francisco, State of California, have invented or discovered an Improved Composition for and Method of Constructing Railway Ties; and I do hereby declare that the following is a full, clear, and exact description of the same, reference being had to the accompanying drawing and letters marked thereon.

The first part of my invention consists in the manufacture of ties for railways and permanent ways by compressing in a suitable mold, by powerful pressure, a compound of very-finely powdered or floured ashes of coal, wood, or any vegetable growth with a viscid glutinous substance, such as linseed-oil, cotton-seed oil, or the resinous exudations from pine trees, and asphaltum or bitumen, the ingredients to be properly prepared and mixed or compounded, as hereinafter described.

The second part of my invention consists, mainly, in the introduction of pieces of wood, provided with screws or threads, placed vertically or otherwise in the tie, so that they cannot be withdrawn, and through which spikes can be driven to fasten the rail down to the tie.

I am aware that recent attempts have been made to manufacture railway ties with a composition of asphaltum and vegetable fiber alone, but as yet unsuccessfully from the lack of the proper tempering agents or ingredients, which my invention supplies, the compound being either too hard and brittle or too soft and yielding for the purposes claimed.

My invention of finely-powdered ashes and linseed-oil or cotton-seed oil as a tempering agent, and my method hereinafter described of affording a wooden base or bed, in which nails or spikes may be firmly driven and withdrawn, renders a valuable invention practical and very useful.

In order that my invention may be fully comprehended, and thereby made useful, I give the following as one of the proportions and methods by which my invention may be successfully applied to the manufacture of the above-named articles.

I melt or liquefy sixteen parts of asphaltum with one part of linseed-oil or cotton-seed oil. (Linseed-oil is preferable.) To this compound, while in a liquid condition, I add a quantity of very-finely powdered or floured ashes of either coal, wood, or some vegetable growth, equivalent to about one and a half times the bulk of the asphaltum, the quantity of ashes used varying somewhat with the softer or harder quality of the asphaltum or bitumen employed. The above compound, after having been thus compounded and mixed by boiling in a caldron or tank, I now place in a suitable mold of whatever form and dimensions that may be necessary to produce the desired shape of the tie to be manufactured. Around the mold I place a coil of steam-pipe to keep it in a suitable temperature while the article is being molded into the desired shape; and to prevent adherence of the material to the mold I coat the sides of the mold with soap-stone or talc mixed with grease. Pressure is then applied, by suitable means, to the mold, and a strong, firm, and substantial product is had of the shape desired, practically indestructible from action of moisture or atmospheric influence.

My invention of thus utilizing a waste product by finely powdering and flouring ashes for combination (by pressure in a mold) with asphaltum must not be confounded with the mere rude mixing of coarse and unequally-sized particles of ashes with asphaltum as a heterogeneous mass; but my invention is of a radically different character, for in one case you have a coarse, brittle, friable, useless mass, but by my invention of finely powdering and flouring the ashes, and tempering with a viscid glutinous substance the asphaltum, and then compressing with suitable molds, there is produced a fine, firm, smooth, hard, tenacious, homogeneous, and highly useful material.

The drawing shows a railway tie with wooden screws inserted.

A represents a wooden screw, which may be inserted in those parts or points of the tie B where it is necessary or desirable to have nails, spikes, or iron screws driven, and the necessary holes may be made in forming the blocks; this gives a basis for the attachment to or withdrawing the nails or spikes from the tie and any superstructure without the least danger of splintering the block.

Iron screws might be employed without the intervention of wood and screwed down into the sleepers of the permanent way; but it is more desirable to use a wooden screw as a bed in which to drive the spikes and nails.

Holes are countersunk in the top of the screw, so that a wrench may be employed for removing the screw, or the screw may be provided with a short head.

The above-described proportion and method is one of the proportions and processes by which my invention may be made useful and practical; but I do not confine myself to the proportions named, but vary them as occasion of use requires for the different degrees of hardness or strength of the article manufactured.

Having thus described my invention, what I claim, and desire to secure by Letters Patent, is—

1. The within-described ingredients for railway ties and permanent ways, when mixed and compounded in about the proportions and manner herein specified and set forth.

2. The employment, in a composition tie, of a plug or plugs of wood, A, provided with threads and countersunk holes C C or upward-projecting head, substantially as and for the purpose specified.

In testimony whereof I have hereunto set my hand and seal.

WILLIAM H. STERLING. [L. S.]

Witnesses:
C. W. M. SMITH,
PHILIP MAHLER.